United States Patent [19]

Takashima

[11] Patent Number: 5,617,673
[45] Date of Patent: Apr. 8, 1997

[54] GRAVITY INDEPENDENT PHOTOSYNTHETIC GROWING SYSTEM

[76] Inventor: Yasukazu Takashima, 1132 San Marcos Dr., Salinas, Calif. 93901

[21] Appl. No.: 153,884

[22] Filed: Nov. 17, 1993

[51] Int. Cl.$^6$ ............................................. A01G 31/00
[52] U.S. Cl. ........................................... 47/60; 47/39
[58] Field of Search ......................... 47/60 W, 60 EC, 47/60 NL, 60 R, 39, 39 M

[56] References Cited

U.S. PATENT DOCUMENTS

| | | | |
|---|---|---|---|
| 986,875 | 3/1911 | Tilghman | 47/39 M |
| 3,870,873 | 3/1975 | Mallory | 47/60 EC |
| 3,882,634 | 5/1975 | Dedolph . | |
| 4,299,054 | 11/1981 | Ware | 47/60 NL |
| 4,505,066 | 3/1985 | Moore | 47/60 R |
| 4,756,120 | 7/1988 | Arledge . | |
| 4,780,989 | 11/1988 | Mears et al. . | |
| 4,932,158 | 6/1990 | Roberts . | |
| 5,095,414 | 3/1992 | Tinus . | |
| 5,241,783 | 9/1993 | Krueger | 47/66 B |

FOREIGN PATENT DOCUMENTS

| | | | |
|---|---|---|---|
| 424467 | 5/1911 | France | 47/60 EC |
| 0650557 | 3/1979 | U.S.S.R. | 47/60 R |
| 0914004 | 3/1982 | U.S.S.R. | 47/60 |
| 2086719 | 5/1982 | United Kingdom | 47/39 M |
| 2239381 | 7/1991 | United Kingdom | 47/60 NL |

*Primary Examiner*—Terry Lee Melius
*Assistant Examiner*—Joanne C. Downs
*Attorney, Agent, or Firm*—Michael J. Hughes; Larry B. Guernsey

[57] ABSTRACT

A gravity independent photosynthetic growing system (10) is provided for use in providing an environment conducive to growing plant materials under unusual conditions, such as are encountered in space or in locales isolated from sunlight. The growing system (10) includes a stationary core assembly (26), a rotating drum assembly (28) which is rotated by a motive assembly (30), an enclosing assembly (32), a growth requirements assembly (34) and a control assembly (35). Illumination lamps (42) situated in the central core (20) provide photosynthetic radiation which is transmitted through light transmissive sector walls (52) to be reflected inward from a surrounding cylindrical reflector (64) into growth sectors (50) within which the plants are grown. The growth sectors are adapted to receive seed mats (178), hard shell growth cases (204) and growth bags (188) which provide purchase for the plants. a deluxe growth requirements assembly (340) provides controlled dispensation of flowable materials by way of pneumatically controlled flow paths. The system (10) is adapted to further provide temperature and moisture to non photosynthetic plants in dark zones (174) within the stationary enclosure (24).

14 Claims, 6 Drawing Sheets

GRAVITY INDEPENDENT PHOTOSYNTHETIC GROWING SYSTEM

TECHNICAL FIELD

This invention relates generally to systems for growing plants under controlled conditions, and more particularly to a photosynthetic growing system and an incorporated plant growth bag which are adapted to be utilized in gravity and orientation independent circumstances, particularly such as in space installations.

BACKGROUND ART

The human species began its ascent to becoming the dominant species on the surface of the earth in large part due to its development of agricultural technique. The ability to grow plants under controlled conditions and to domesticate animals allowed groups of humans to remain in a particular location for extended periods of time and to generate greater amounts of food than were necessary for immediate consumption.

A necessity for producing food under controlled conditions, particularly under adverse conditions, has remained a priority of the species since prehistoric times. Artificial growing environments, ranging from those found in ordinary greenhouses to those found in restricted circumstances such as caves, submarines and the like are utilized and are desirable for a variety of reasons. One of the primary reasons for controlled situs agriculture is to produce food for those who are cut off from ordinary sources of fresh produce. This is particularly important in the consideration of long term space voyages and permanent stations, in which the difficulties of transporting fresh produce to the inhabitants will be extremely high.

An important byproduct of the use of photosynthetic plants in a closed environment is that the plants recycle carbon dioxide generated in the breathing process of mammals, such as humans, and produce oxygen therefrom. For this purpose, as well, it is of significant importance for methods to be developed for efficiently growing photosynthetic plants in oxygen deprived circumstances.

A variety of prior art methods have attempted to grow plants of different types under controlled conditions. These have included a number of developments in the field of hydroponics and a large variety of efforts relating to the growth of algae and plankton.

Some of these methods have been reflected in specific structures to be utilized for efficient growth of plants under limited and adverse conditions. One such is found in U.S. Pat. No. 4,932,158, issued D. Roberts. This hydroponics structure facilitates a flow process growth system which is highly mechanized. Further, U.S. Pat. No. 4,780,989, issued to S. Mears, et al., demonstrates a further hydroponics system. A system which utilizes a gravity feed, and thus would be limited for gravity independent conditions such as might be present on a space station, is shown in U.S. Pat. No. 4,756,120, issued J. Arledge. Each of these structures represents an advance in the art, but none solve all of the problems which are expected to be encountered in the limited space, recycled environment, growing conditions of the space station and the like.

Once structure which has been developed specifically for utilization in gravity independent systems is illustrated in U.S. Pat. No. 3,882,634, issued R. Dedolph. This structure utilizes a rotary method with multiple growing locations on each of a variety of vanes. The radially spaced vanes are rotated on a central structure and are provided with nutrient infusion by a controlled system. It is particularly noted that the Dedolph patent provides a detailed discussion of the mathematics and physics involved in the growth of plants under gravity independent conditions.

Plants which are grown under controlled conditions in environmental isolation are subject to limitation in receiving adequate supplies of four primary growth requirements. For most plants, and particularly for the "salad" type of plants, which are particularly desirable for consumption by humans under confined conditions, these requirements include lights(electromagnetic radiation in the appropriate wavelengths for providing photosynthesis); carbon dioxide (ordinarily available through the ambient air); water and growth support nutrients. Beyond this, the plants must also have sufficient room to grow in a natural fashion and must have physical support.

One particular area in which a variety of techniques have been utilized is in the provision of light. It is well known among greenhouse operators that, for example, plant growth stimulation may be achieved by modifying the nature and duration of light which is provided to the plants. Further, the intensity and concentration of the electromagnetic energy is also important in achieving proper growth. For example, it has been found that direct radiation can be much less efficient in achieving significant and even growth in a wide variety of plants than is diffuse radiation.

One example of a patent on a structure which utilizes reflective techniques in order to provide the desired degree of electromagnetic radiation to a particular growing environment is shown and described in U.S. Pat. No. 5,095,414, issued to R. Tinus. This patent illustrates a method in which a parabolic reflector is utilized to sweep over an array of plants and to provide the necessary degree of illumination.

Despite many advances in the art and substantial efforts in a number of countries, there remains a great deal of room for improvement in providing methods for growing plants under confined and adverse conditions. In particular, the development of handy, energy efficient, space efficient and lightweight growing structures for use in the space program is particularly desirable. Since nothing has filled all of the requirements, to date, there remains substantial room in the field for new and innovative structures and techniques.

DISCLOSURE OF INVENTION

Accordingly, it is an object of the present invention to provide a photosynthetic growing system for plants which may be self contained.

It is another object of the present invention to provide a growing system which may simultaneously support a variety of plants at different stages of growth.

It is a further object of the present invention to provide a growing system which is operationally independent of gravity requirements.

It is yet another object of the present invention to provide a growing system which requires a minimal amount of manual attention during the growth cycle of the desired plant.

It is a still further object of the present invention to provide diffuse electromagnetic radiation to the plants and to cause the plants to grow in a natural shape.

It is still another object of the present invention to provide a growing system which may be readily customized to the needs of the particular variety of plants involved, so that the same system may be utilized for a wide variety of potential produce.

The present invention is a gravity independent photosynthetic growing system which is adapted to provide optimal growth condition to a variety of small photosynthetic plants under controlled conditions. The system is adapted to be utilized in adverse circumstances such as in isolated vehicles, including submarines and space vehicles. It is adapted to be essentially self-contained, with a possible exception of a power source, in order to provide all of the needs of the growing plants during the entire life cycle. The system is adapted to include a plurality of independent plant growth bags, each of which will contain a plurality of individual plants which may be supported under controlled conditions.

Briefly, a preferred embodiment of the present invention is a gravity independent photosynthetic growing system which utilizes rotational motion of the plants about a central axis and a reflective light distribution system to provide optimal growth characteristics for plants which are arranged in growth sectors. Each growth sector may optionally include an elongated plant growth bag. The preferred embodiment primarily includes a stationary central core and a rotating drum cylinder (wherein the plants are situated) all contained in a stationary enclosure. The primary growing system includes a variety of assemblies (subsystems), each of which is adapted to provide for some of the requirements of the plants.

A stationary core assembly provides the location for the light generation means and for stationary electrical and material delivery conduits. A rotating drum assembly, which is caused to move by a motive assembly, provides the support for the plants themselves and moves the plants from location to location in order to provide the appropriate exposure and nutrient delivery. An enclosing assembly completely surrounds the drum assembly and supports the various components. A growth requirement assembly, which is distributed throughout the structure, provides for the various growth requirements for the plants, including light, gaseous components, water and minerals. The entire growing system is adapted to be contained in a compact location with accessibility by the user to the plants when it is necessary for harvest or other processes. User accessible controls are part of the growth requirements assembly and provide a method by which the user may adjust the parameters of the system so that they may be optimized for the particular type(s) of plant being grown. A deluxe growth bag assembly may be incorporated to provide a modular insert for a growth sector. The preferred embodiment is particularly well adapted for the growth of "salad" type plants such as lettuces and other leaf vegetables.

An advantage of the present invention is that a relatively constant diffuse light of appropriate intensity is delivered to the plants in a manner which permits them to achieve a natural growth shape.

Another advantage of the present invention is that it is entirely self-contained and may be utilized under environmentally adverse conditions.

A further advantage of the present invention is that it provides a variety of relatively independent growth sectors which may have different timings for growth cycles and are not dependent upon each other in a linear fashion.

A further advantage of the present invention is that the user may control environmental conditions and nutrient delivery in such a manner as provide optimal conditions for a variety of plants.

Yet another advantage of the present invention is that it is substantially automatic in operation, once set, and requires minimal attention from the time of planting until the time of harvest.

A still further advantage of the present invention is that it is space efficient and compact and may be constructed to conform to limited space requirements, such as in vehicles or extra-terrestrial installations.

Yet another advantage of the invention is that the physically separate growth sectors and the isolated plant growth bags allow specifically tailored growing conditions for different plant varieties within a single system.

Still another advantage of the present invention is that it may be made independent of orientation, with the systems being adapted to work in any gravitational orientation, including weightlessness.

A further advantage of the invention is that it is unobtrusive, in that it may operate in a quiet manner and without an obvious impact on the surrounding environment.

These and other objects and advantages of the present invention will become clear to those skilled in the art upon review of the following description of the best mode, the accompanying drawings and the appended claims.

BEST MODE FOR CARRYING OUT THE INVENTION

The best presently known mode for carrying out the present invention is a photosynthetic growing system characterized by being self contained and adapted for utilization in a variety of circumstances. In particular, the photosynthetic growing system is adapted to be gravity independent in usage, so it may be adapted for utilization in null gravity conditions, such as those present on a space station. However, the system is also equally adapted for use in normal gravity conditions and may be utilized in circumstances where there are adverse growing conditions, in isolated locations, and/or in vehicles such as submarines.

Figure 1:
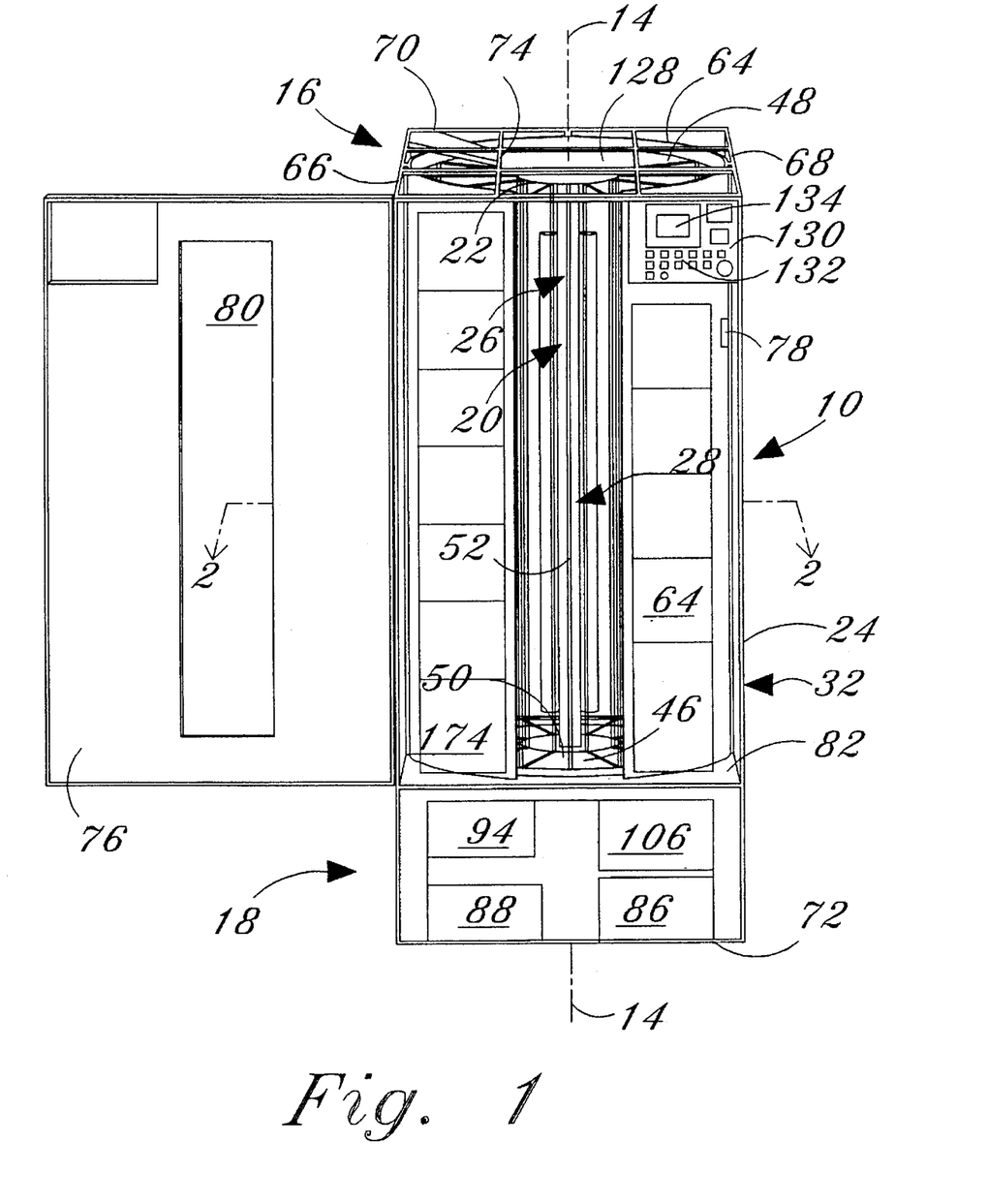
FIG. 1 is a perspective view of a photosynthetic growing system according to the preferred embodiment of the present invention.

The preferred embodiment of the present invention is a photosynthetic growing system which is illustrated in a perspective view in FIG. 1, and is designated by the general reference character 10. The growing system 10 is particularly adapted for use with growing plant material 12, especially leaf vegetables such as lettuce.

For the purposes of description, the growing system 10 may be considered to be substantially radially symmetrical about a primary axis 14 with one portion of the system 10 being designated as the "top" 16 and the opposing portion being designated for convenience as the "bottom" 18. It is understood that these designations are arbitrary since this system is adapted to be utilized in any orientation. However, the directional designations are supplied for the purposes of ease of description, and will be the typical orientations for the usage of the system under gravity.

The gravity independent photosynthetic growing system 10 may be considered to have a variety significant portions for description purposes. One of these portions is a central core portion 20, which is a stationary cylindrical section surrounding the primary axis 14. The central core 20 is circumferentially surrounded by a rotating drum cylinder 22. A stationary enclosure 24, in the form of a hollow rectangular solid in the preferred embodiment 10, surrounds the drum cylinder 22 circumferentially, as well as at the top 16 and bottom 18 of the system 10.

The growing system 10 may also be considered as an assemblage of a variety of specific functional assemblies (subsystems), each of which serves a particular purpose. These include a core assembly 26, a drum assembly 28, a motive assembly 30, an enclosing assembly 32 and a growth requirements assembly 34. Some components within the system 10 may function as a part of more than one of the designated assemblies. However, it is convenient to think in terms of the assemblies in understanding the function of the various components.

Figure 2:
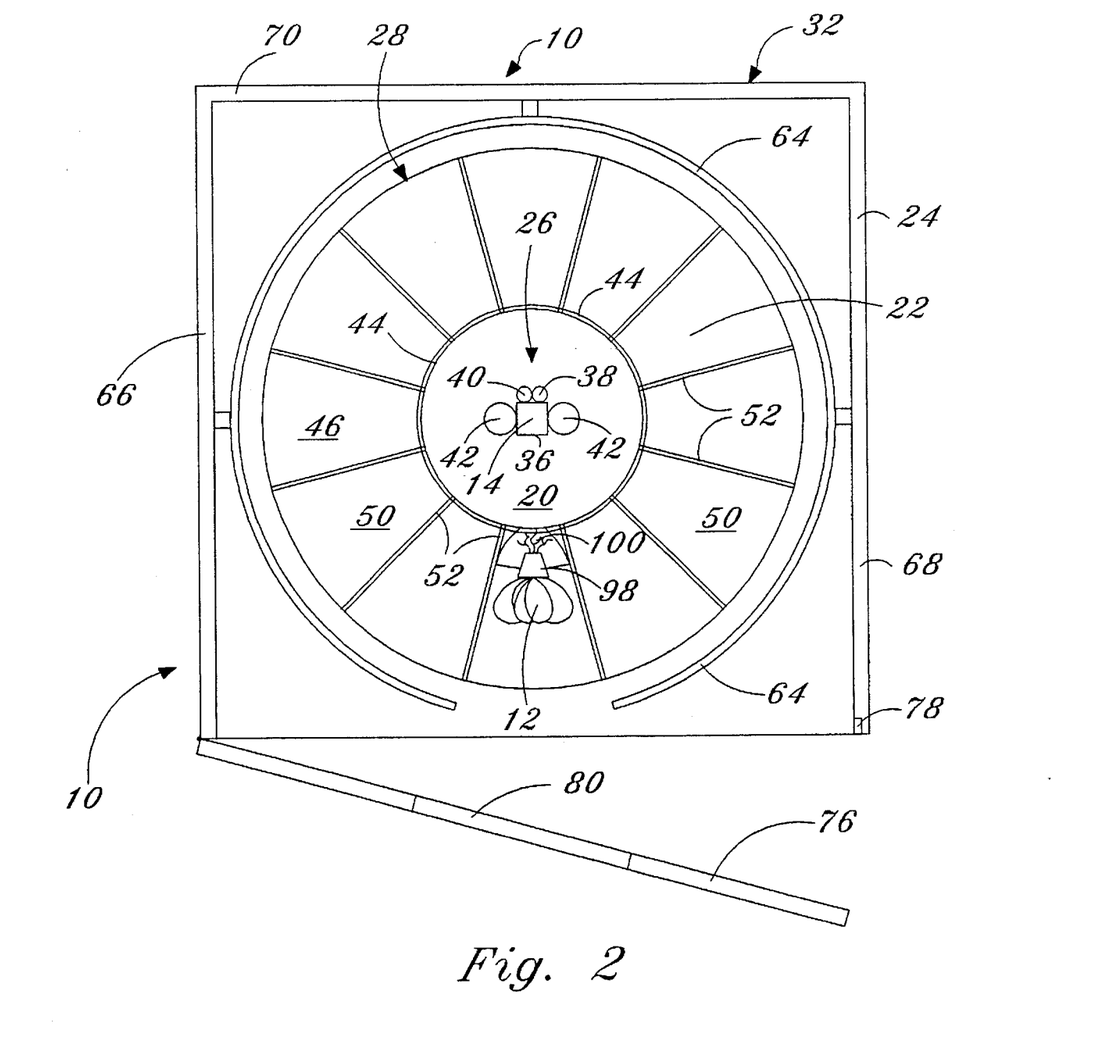
FIG. 2 is a cross sectional view of the preferred photosynthetic growing system, taken along line 2—2 of FIG. 1.

The components of the core assembly 26 may best be understood from a consideration of the cross sectional view of FIG. 2. In this illustration, it may be seen that a central axial post 36 extends along the primary axis 14. The axial post 36 is a structural member and also provides support for a series of electrical conduits 38 and fluid conduits 40. In the preferred embodiment 10, the axial post 36 also provides support for a pair of axially arrayed illumination lamps 42. The illumination lamps 42 illustrated in the drawings are elongated high pressure sodium lamps, which have been found to have the best efficiency for plant growth for the salad types of plant material 12 which are the primary utilization. It is desired that the illumination lamps 42 extend longitudinally throughout a very substantial portion of the central core 20 so that there is not a wide variation in the intensity of illumination at different points along the primary axis 14.

The drum assembly 28 is illustrated in several of the drawings and is the location in which the actual plant growth will occur. As is particularly seen in FIG. 2, the preferred rotating drum assembly 28 includes an elongated central tube member 44 which forms the interface between the drum assembly 28 and the core assembly 26. The central tube member 44 is formed of a transparent material such as Plexiglas™. The central tube member 44 extends longitudinally about the primary axis 14 intermediate a base disk 46 and a top disk 48. The base disk 46 and the top disk 48 each include holes in the center (surrounding the core assembly 26) and extend radially outward from an inner edge congruent with the central tube member 14.

The space intermediate the base disk 46 and the top disk 48 is divided into a plurality of growth sectors 50 by a plurality of elongated sector plates 52. In the preferred embodiment 10, illustrated in the drawings, twelve sector plates 52 are equally radially spaced so as to divide the drum assembly 28 into twelve of the longitudinally extending growth sectors 50. The sector plates 52 are selected to be light transmissive and to have a discrete thickness so as to act effectively as fiber optic structures to transmit the light created by the illumination lamps 42 outward therefrom and through the outer edges. The sector plates 52 are essentially rectangular panels which are arrayed radially so that each of the growth sectors 50 is narrower at its radially inward portions and gradually expands in width to the radially outward portions. The growth sectors 50 are outwardly open for ready access, so that there is no circumferential exterior tube corresponding to the central tube member 44 of the drum assembly 28. The structural support is provided by the central tube 44, the rigid base disk 46 and the top disk 48, with the sector 52 being secured therebetween.

Figure 4:
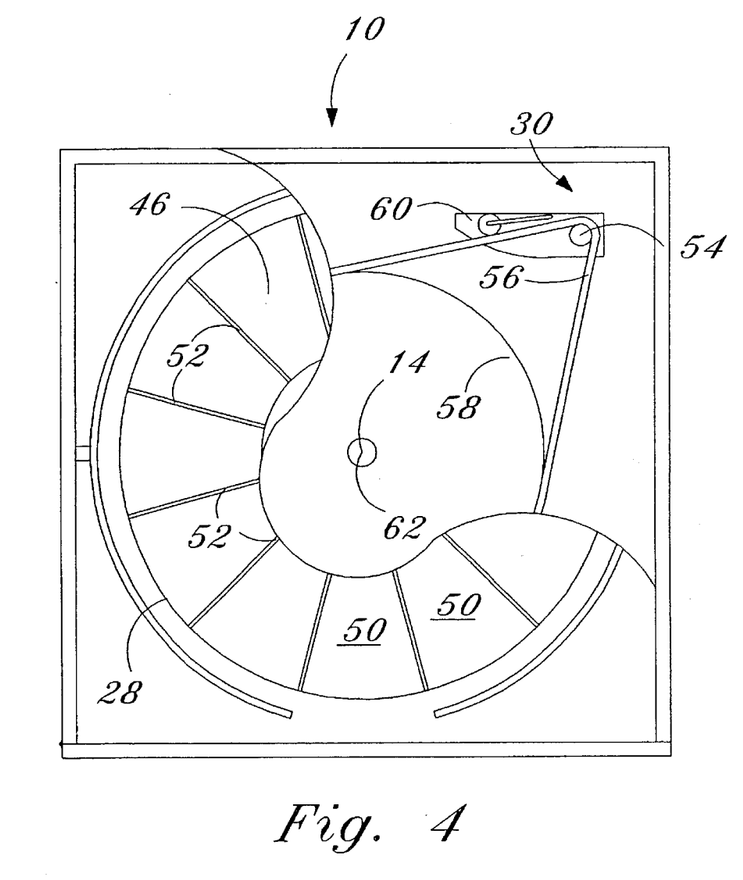
FIG. 4 is a partially cut-away top view of the rotating base plate portion of the invention, and the underlying structure.

The drum assembly 28 is adapted to be selectively rotated (on a timer mechanism so that the rotation is usually continuous) about the primary axis 14. As is particularly shown in FIG. 4, the motive assembly 30 is utilized to rotate the drum assembly 28. The motive assembly 30 includes a gear motor 54 which drives a drive belt 56 which is connected to a drive wheel 58 which is secured to the bottom of the base disk 46. A tension wheel 60 is placed on the path of the drive belt 56 in order to provide proper spacing and tensioning, the tension wheel 60 being adjustable, with the adjustment in the preferred embodiment being automatic. The drive wheel 58 is mounted upon a bearing shaft 62 which connects the base disk 46 to the enclosing assembly 32 in a manner which allows rotation about the primary axis 14.

The enclosing assembly 32 is best understood from FIGS. 1 and 2 of the drawings. The enclosing assembly 32 provides the method by which the plants and the interior environment of the growing system 10 are isolated from the ambient environment. The enclosing assembly is insulted to prevent unwanted heat transference in either direction. Material passage is also prevented by complete enclosure. Further, the enclosing assembly is shaped for ready positioning and securing in desired locations and to be anesthetically acceptable provide locations for many of the necessary components.

Immediately circumferentially surrounding all except a portion of the front of the drum 28 is a cylindrical reflector 64. The cylindrical reflector 64 is reflective on its interior surface in such a manner that light from the illuminating lamps 42 is reflected back on to the plants 12 from a radially exterior direction. The cylindrical reflector 64 is open to the front to allow access to the growth sectors 50 for manipulation of the contents. The cylindrical reflector 64 extends about the entire height of the growth sectors 50 and is adapted to provide relatively even illumination to the interior of the growth sectors 50 whenever the illumination lamps 42 are activated. The cylindrical reflector 64 further prevents light from reaching other portions of the system 10, so that the corners of the enclosing assembly are "dark".

The enclosing assembly 32 further includes a left side wall 66, a right side wall 68, a rear wall 70, a base plate 72 and a top plate 74, all of which, together, form a rectangular enclosure which is completed by a door 76. The door 76 is adapted to be held in a closed position by a door latch 78. A vertical panel in the center portion of the door 76 is provided with a window 80. The window 80 is selected to be "one-way" glass so that it is feasible for the observer to view the contents of the growing system 10 during operation, without opening the door, while a substantial portion of the illumination is reflected back into the growth sector 50, so that even when a growth sector is arrayed opposite the door 76, the photosynthetic inducing radiation is still delivered to the plants 12.

As is shown in the illustration of FIG. 1, the enclosing assembly 32 includes a floor plate 82 which separates a lower chamber 84 from the portion of the enclosure 24 wherein the rotating drum cylinder 22 is enclosed. The lower chamber 84, which is located at the bottom be of the enclosing assembly 32, provides a location in which a water reservoir 86 and other auxiliary structures may be enclosed. One such structure which would ordinarily be enclosed in the lower chamber 84 would be an air conditioning unit 88, which is utilized to maintain a proper and uniform temperature within the growing system 10

The water reservoir 86 and the air conditioning unit 88 form components of the growth requirements assembly 34. The growth requirements assembly 34 is a group of functionally related components which are physically spread throughout the growing system 10 and are adapted to provide for the needs of the growing plant. As such, the components will ordinarily be part of more than one of the designated assemblies, but to the extent that they are functionally related to providing for the growth requirements of the plants, they are described at this juncture. Others, such as the illumination lamps 42 and the fluid conduits 40, have already been discussed.

Figure 5:
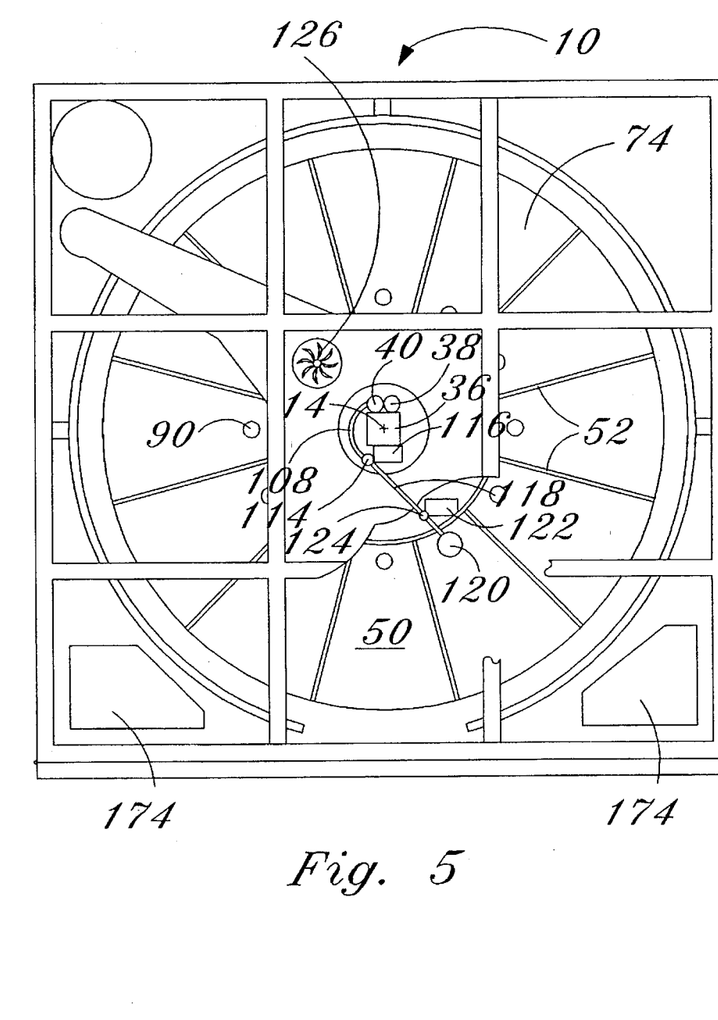
FIG. 5 is a top plan view of the interior of the invention.

A number of the components of the growth requirements assembly 34 are situated at the top 16 of the growing system 10, in conjunction with, or slightly above the top plate 74. As is seen particularly in FIG. 5, the top plate 74 is provided with a series of radially spaced input apertures 90. One input aperture 90 is provided for each growth sector 50. Similarly, a corresponding series of output apertures 92 is provided in the base disk 46, opposite the input apertures 90 in the top disk 48. The input apertures 90 and output apertures 92 are adapted to provide the end points of an internal flow path within the drum assembly 28 This flow path is adapted to provide liquids and dissolved or suspended solids as well as, to a lesser degree, air, to the growing plant material 12 which is contained therein. In the orientation of the drawing of FIG. 1, and under gravitic conditions, the growth materials will be caused to flow through the growth sectors 50 by the action of gravity, as well as by osmotic pressure. However, in a gravity independent situation, the flow of materials is also urged by air pressure provided primarily a vacuum pump 94 which creates a negative pressure at the output aperture 92, thus having a similar effect to that of gravity.

Figure 3:
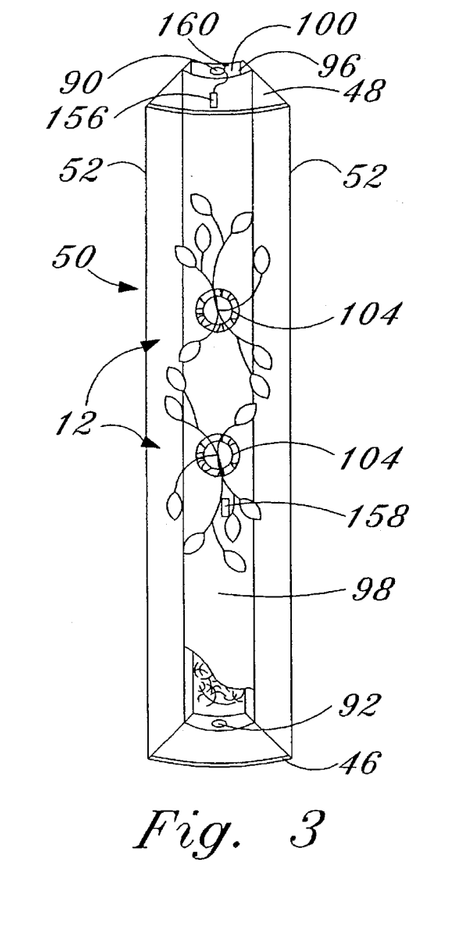
FIG. 3 is a front plan view of one of the growing sectors of the present invention.
Figure 6:
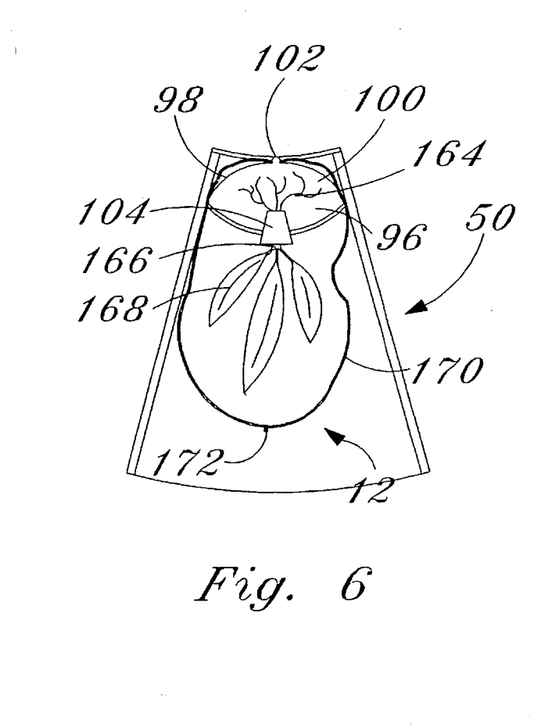
FIG. 6 is a detailed cross sectional view of a growth sector, showing a plant growing therein.

As is shown particularly in FIGS. 3 and 6, within the preferred 10 embodiment, the growing plants 12 are supported within the growth sectors 50 on a growth substrate 96. The growth substrate 96 will typically extend from the input aperture 90 to the output aperture 92 and will be sealed thereto. In the preferred embodiment of the growing system 10 illustrated in the first six figures of the drawings, the growth substrate 96 includes an elongated root bag 98 which is provided with an internal rooting medium 100 into which the roots of the plant extends. The rooting medium 100 will typically be a compressible matrix material which may be impregnated with growth nutrients and will provide both an anchoring medium and a source of nutrients to the plant 12. The rooting medium 100 will extend the entire effective length of the root bag 98. Although closely contained in the root bag 98, the rooting medium is sufficiently porous, that, in use, fluid may flow therethrough under normal conditions in much the same manner in which it would flow through soil. To this end, the rooting medium 100 is typically at least somewhat absorbent so as to retain water therein for gradual usage by the roots of the plant 12. The root bag 98 would ordinarily be secured to the central tube member 44, and/or portions of the sector plates 52, by securing ties 102 or the like, to prevent shifting during usage.

In order to permit the plant 12 to grow outward into the growth sector 50, the root bag is provided with a series of stem portals 104 (apertures) on the side opposite the central core 20. The stem portals 104 are situated opposite the location where the roots of the plant 12 are attached to the rooting medium 100. The stem portals 104, and the other components of the root bag 98, are discussed in greater detail hereinafter.

A fluid pump 106, typically associated with the water reservoir 86, delivers water from the reservoir 86, through the fluid conduit 40 and to a fluid delivery structure 108, situated above the top disk 48 so as to deliver fluids to the input port 90. The fluid delivery structure 108 is attached to the fluid conduit 40 and includes a nutrient input port 110, which is an optional structure in which flowable nutrients, such as fertilizer and the like, may be introduced from a nutrient reservoir 112 into the fluid which is to be delivered to the plants 12.

A flow valve 114, the opening and closing of which is controlled by a flow valve relay 116, controls the flow of fluid into a delivery tube 118. The delivery tube 118 terminates in a port adapter 120 which is adapted to mate effectively with the input port 90. The port adapter 120 is intended to fit within the input port 90 in such a manner that fluid delivered through the fluid delivery tube 118 flows exclusively into the root bag 98 and is not misdirected.

For gravity independent operations, the fluid delivery tube 18 and the port adapter 20 are physically coupled with a positioner 122. The positioner 122 is adapted to insert the port adapter 120 into the associated input port 90, when desired, forming at least a marginal seal therewith to avoid spillage, and to extract the port adapter 120 from the associated input port 90 when the fluid delivery process is complete.

It is also noted that the fluid delivery tube 118 and the positioner 122 are adapted to partially rotate about a pivot 24 in order to follow the associated input port 90 as the entire drum assembly 28 rotates. Since the photosynthetic plant growing system 10 is adapted to operate in a relatively continuous motion, both for efficiency of motor operation and for relative quiet, it is desirable to have the port adapter 120 mate with the input port 90 at an early stage as the particular growth sector 50 rotates past the fluid delivery structure 108, and to remain in interface throughout the range of rotation of the pivot 124. Proper timing assures this and results in the maximum amount of fluid delivery for each pass or rotation for the particular sector 50.

In order to aid in maintaining thermal equilibrium throughout the photosynthetic growing system 10, a central fan 126 (shown in phantom in FIG. 5) is located on the primary axis 14 essentially at the top of the central core 120. The central fan 126, which is associated with deflectors 128 which extend above the central core 120, will ordinarily be in constant operation. The action of the central fan 126 is to draw air upward through the central core 20 and to effectively circulate the heat generated by the illumination lamps 42 throughout the entire enclosure 24. The central fan 126 pulls heated air from the central core 20 through vents 127 formed in the top disk 48 and directs the air outward to other portions of the system, particularly the sprouting areas discussed later. Also, the air flow is directed outward by deflectors 128 so that a desired quantity will enter the growth sectors 50 and provide air flow to the plants 12 to avoid stagnation problems.

The operation of the various portions of the growth requirements assembly 34 and the other components of the gravity independent photosynthetic growing system 10 is provided by the control assembly 35. The primary visible component of the control assembly 35 is the control panel 130, which in the preferred embodiment 10 is situated at the upper right hand portion inside the door 76. The control panel 130 is adapted to permit customized settings and special operator input so as to provide optimal growing conditions for the types of plants 12 utilized. The control panel 130 is provided with an input keypad 132 and a display 134. Various conventional electronic components, including timers 136, are also provided, typically in the form of a circuit board construction associated with the control panel 130.

In the preferred embodiment 10, it is intended that the control panel 30 may be utilized to control a wide variety of parameters. In order to accomplish this, a light on/off control 138 and a light intensity control 140 are provided in order to control the status and illumination intensity of the illumination lamps 42. Further, a rotation control 142 is provided to adjust the speed of the gear motor 54, and thus the rotational rate of the rotating drum cylinder 22. A rotational interrupt 144 is also provided for those circumstances in which the user wishes to halt the rotation of the drum cylinder 22, such as when it is desired to plant new growing plant material 12 or to harvest. The rotation control 142 may also be adapted to be manually operated by the user in order to cycle through the sectors 50 in a rapid manner or to cycle to a particular growth sector 50, when desired.

A thermal control 146 is utilized to operate the air conditioner unit 88, including both heating and cooling capabilities, to maintain a desired, operator selected, internal temperature, assisted by one or more thermal sensors 148 situated within the stationary enclosure 24. The thermal control 146 may be adjusted to the user's desire, such as in order to provide a variable temperature pattern to simulate earth growing conditions, or the like. It may also be adjusted to the optimum temperature for the particular plants 12 which are being utilized.

One of the more complex component subassemblies of the control assembly 35 relates to the delivery of fluid and nutrients to the plants 12. For this purpose, a fluid control component 150 is provided with an associated nutrient control 152 in the preferred embodiment. The primary operation of the fluid control component 150 is to operate the fluid pump 106 and the fluid delivery structure 108 to deliver timed, and/or feedback-controlled, fluids through the port adapter 120 into the growth substrate 96. The nutrient control 152 is adapted to operate the nutrient input 110 to deliver a predetermined nutrient input into the fluid flow.

In the preferred embodiment 10, (a more detailed alternate structure is discussed hereinafter) the fluid control 150 operates by a feedback mechanism in which a plurality of saturation sensors 154, associated with each of the growth sectors 50, provide an electrical analog which corresponds to the degree of fluid saturation in the rooting medium 100. The degree of fluid delivery to each of the growth sectors 50 may be individually set and modified by the user to correspond to the degree of "wetness" which is desired in the rooting medium 100 in order to allow for optimal growth of the particular plant material 12 which is contained in that growth sector 50. Further, in the event of an empty sector 50, or the like, the fluid delivery mechanisms associated with that sector may be entirely disabled by appropriate setting of the fluid control 150.

The saturation sensors 154 are utilized to sense the moisture content level within the rooting medium 100, by measuring the electrical flow through the path between an upper sensor 156 and a lower sensor 158 in each sector 50. The saturation sensors 154 are in the form of electrical probes which are placed within the rooting medium 100 as illustrated in FIG. 3. The electrical signals from the saturation sensors 154 are then delivered to the fluid control unit for analysis and adjustment of the amount of fluid which is to be delivered to that particular sector. Electrical delivery, on a per sector basis, may be accomplished in a variety of ways. However, in the preferred embodiment a contact pad 160 is associated with each of the probes and a contact brush 162, which is stationary and will contact the associated contact pad 160, only when the sector 50 is in the proper position, is utilized to close the circuit and return the signal to the fluid control 150.

One logical placement of the contact brushes 162 is to have the contract brushes 162 contact the associated contact pads 160 of the saturation sensors 154 in the sector 50 which is next due to come into the range of the fluid delivery structure 108. In this manner, the fluid control 150 may measure the degree of saturation within the sector 50 which will next appear, and may adjust the duration of delivery of fluid through the associated input port 90. Other schemes may also be utilized to accomplish the same sort of approach, as discussed with respect to FIG. 10. Typically, it is desired to provide a fixed time application of fluid through the input port 90 for each rotation, with one or more rotations being skipped when the saturation is sufficient for the needs of the plants.

Referring now to FIG. 6, the detailed structure of the manner in which the growing plant materials 12 fit within one of the growth sectors 50 is illustrated. As it may be seen, the growing plant material 12, in this case a leafy vegetable, includes roots 164, one or more stems 166, and an amount of foliage 168. In the preferred embodiment of the present invention 10, the roots 164 will be contained within the root bag 98 and will grow within the rooting medium 100. The stems 166 will exit the root bag into the remainder of the growth sector 50 through the stem portal 104. As is shown particularly in FIG. 3, the root bag 98 has a plurality of vertically spaced stem portals 104 so that several plants may be grown within the same sector 50.

An optional additional component which is illustrated in FIG. 6 is an inflated foliage bag 170 which may be utilized to enclose the foliage 168 completely so as to avoid contamination. In this instance, if the input port 90 and the output port 92 are generally sealed, except when material transference is occurring, the growing plant material 12 may be completed isolated from the ambient atmosphere and thus prevented from contamination. In order to facilitate the utility of such a structure, the foliage bag 170 is provided with a closure strip 172 (similar to those found on reclosable food bags). The closure strip 72 allows the user to open the foliage bag 170 and manipulate or harvest the foliage 168 and then to reseal the bag, if desired. The closure strip 172 is optional since it may be that the various plants within a single foliage bag 170 will all be harvested at the same time, in which case the bag may be destructively opened.

The corners of the enclosure 24, about the reflector 64, may also be utilized. These areas provide locations for elements such as the nutrient reservoir 12 and various conduits.

In addition, it is useful to reserve portions of the enclosure 24 for dark zones 174 which are unlighted but are accessible and which can be used for production of sprouts such as bean sprouts, alfalfa sprouts or light averse foodstuffs such as mushrooms. These dark zones 174 would typically be located in the front corners of the enclosure 24, as illustrated in FIG. 1 particularly, and they are adapted to receive sprout strays 176 and the like for growth of the particular plant material which is desired.

Figure 7:
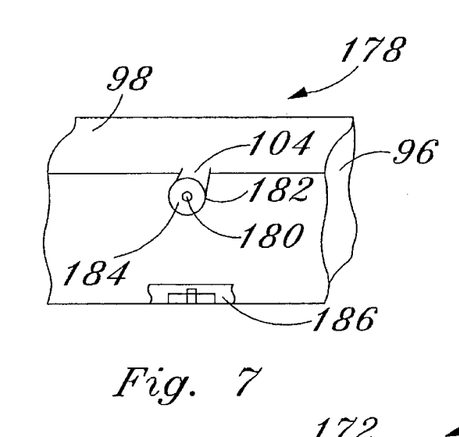
FIG. 7. is partially cut away perspective view of a seed mat.

FIG. 7 illustrates, in a cut-away view, a type of seed mat 178 which may be used in conjunction with the photosynthetic growing system 10. The seed mat 178 is utilized for storing seeds until ready for activation and then providing the medium for germinating and growing the plant in a manner which is useful with respect to the growing system 10.

The seed mat 178 is very similar to the root bag 98 described above in that it is in a form of a plastic bag having a compressed growth substrate 96 enclosed therein. The seed mat 178 will be mounted within one of the growth sectors 50 when desired and will be connected to the fluid delivery structure 108.

As illustrated in FIG. 7, a portion of this seed mat 178 is adapted to support a seed 180 which is enclosed in a seed cavity 182. The seed 180 will be encapsulated in a pellet of absorbent polymer material 184 such that it essentially fills the seed cavity 182. It is noted that the seed cavity 182 is situated adjacent to the surface of the seed mat 178 and that a stem portal 104 is creative by the insertion of the polymer pellet 184, including the seed 180 into the see mat 178.

The characteristics of the polymer pellet 184 are such that when water is provided to the seed, the polymer pellet 184 will expand and form an affective seal. The polymer pellet 184 also maintains the water in close association with the seed 180 such that proper germination and early growth stages occur. The fluid is provided into the seed mat 178 by a fluid distribution tube 186 associated with the seed mat 178 and connected to the fluid deliver structure 108. During storage, as shown in FIG. 7, the fluid distribution tube 178 is compressed and folded such that the seed mat 178 maybe stored in most sufficient manner.

When water is delivered to the compressed growing medium 96 within the seed mat 178, the growing medium 96 will began to expand and the seed 180 will begin to germinate. The seed mat 178 will "inflate" and the seed 180 will germinate such that a germinated sprout will extend out of the polymer pellet 184 (now in the form of a gel) through the stem portal 104 due to phototropism. The expansion of the polymer get 184 and of the sprout will create an effective seal at the stem portal 104 and will prevent fluid leakage from the root zone into the growth bag which is associated therewith.

Figure 8:
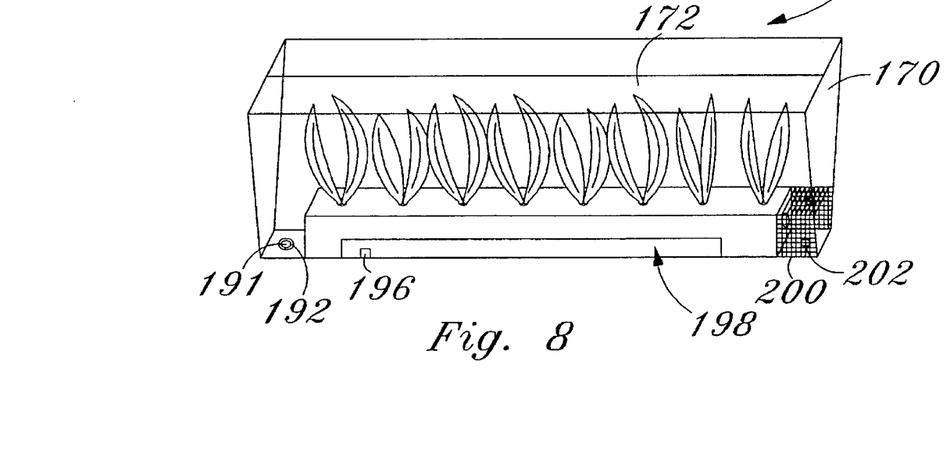
FIG. 8 is a perspective view of a deluxe plant growth bag assembly.
Figure 9:
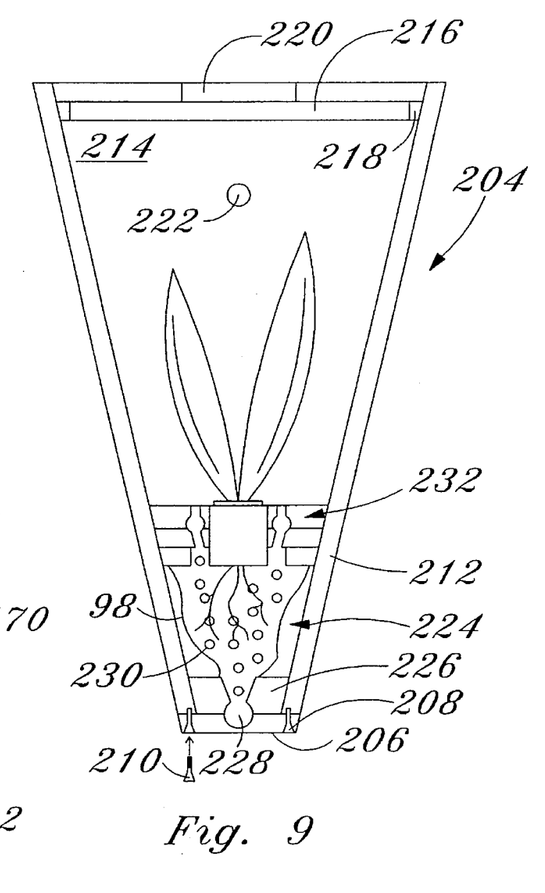
FIG. 9 is a cross sectional view, taken along line 9—9 of FIG. 8, of a hard shell growth case.

Although the gravity independent photosynthetic growing system 10 of the present invention is adapted to be utilized with a variety of structures for supporting individual plants, a particular form of deluxe growth bag assembly 188 is illustrated in FIGS. 8 and 9. The deluxe growth bag assembly 188 combines a variety of features into a single assembly in order to provide maximum desirable growth characteristics and minimal maintenance requirements during usage. The deluxe growth bag assembly 188 includes several of the features previously discussed in a self contained unit.

The climate control volume in which the growing plant material 12 is allowed to grow in the deluxe growth bag assembly 188 is provided by a bag enclosure 190, a majority of which is the same of the foliage bag 170 discussed earlier.

The bag enclosure 190 is adapted to be inflatable such that it may be collapse during storage but may be inflated in order to essentially conform to the shape of one of the growth sectors 50. This variety of inflated shape provides the maximum room for the plant material 12 to expand during the growth cycle while making most efficient use of the available space. The optional "ziplock" type closure strip 172 is provided for harvesting and maintenance. In order to provide for inflation, an air inlet port 192, including an reinforcing ring 194 is situated at one end of the bag assembly 188 (typically at the top 16). The air inlet port 192 is typically connected to an air supply, as discussed with respect to FIG. 10 and the reinforcing ring 194 is provided to prevent tearing of the bag enclosure 190 in the vicinity of the air inlet port 192.

A fluid inlet port 196 is provided through the bag enclosure 190 and directly into the substrate bag 198. The substrate bag 198 selected may be the seed mat 178 or the previously discussed root bag 98 or some other medium in which the growing plant roots are enclosed with access for the foliage through portals into the foliage bag 170.

In this embodiment the nutrients required by the growing plant material 12 will already be present in the substrate bag 198. However, it is also feasible to add additional nutrients through the fluid input port 196.

At the end of the substrate bag 198 opposite the inlet ports 192 and 196 (usually the "bottom" 18) a filter 200 is provided to prevent particulate contamination from entering the fluid delivery system 108. The filter 200 is placed intermediate the substrate bag 198 and a common outlet port 202. The common outlet port 202 receives both excess fluids and excess gaseous materials to prevent over inflation of the bag enclosure 190.

The deluxe bag enclosure 188, of FIG. 8, is particularly characterized by its modular structure and its low maintenance design. Once it has been connected to the fluid and air delivery systems it will require essentially no maintenance from the time of the installation until the plant material 12 is ready for harvest.

FIG. 9 illustrates, in cross section, yet another embodiment of a modular growth component system which may be utilized in conjunction with the photosynthetic growing system 10. The particular embodiment illustrated in FIG. 9 is a hard shell growth case 204 which is adapted to mate with and be attached to the photosynthetic growing system 10, within one of the growth sectors 50.

As illustrated in FIG. 9, the hard shell growth case 204 includes a curred base plate 206 which is adapted to abut against the central tube member 44. A plurality of boltholes 208 are provided along the length of the base plate 206 so that the hard shell growth case 204 may be secured to the central tube member 44 by bolts 210.

The hard shell growth case 204 further includes a pair of oppose side walls 212 which are adapted to abut against the sector plates 52 on either side of the growth sector 50 in which the hard shell growth case 204 is installed. An end wall 214 is also provided at each end of the growth case 204. In order to seal the interior of the hard shell growth case 204, a lid plate 216 is provided to fit within the open end provided by the side walls 212 and the end walls 214. The lid plate 216 is provided with a circumferential sealing strip 218 such that an effectively airtight seal is provided. In order to facilitate removal of the lid plate 216, at the time of harvest, for example, a handle 220 is provided at some point on the exterior surface of the lid plate 216.

Air is provided into the hard shell growth case 204 through a air inlet 220 formed in one of the end walls 214, usually the one situated at the "top" 16 of the system 10.

A root chamber portion 224 of the hard shell growth case 204 provides the zone in which the roots 164 of the growing plant material 12 may expand. The root chamber portion 224 includes, adjacent to the base plate 206, a permeable pad 226 which provides structural support while allowing passage of fluid and gaseous materials therethrough. A fluid passage 228 is situated at the interior surface of the base plate 206. The fluid passage 228 provides the manner by which fluids and nutrients may be supplied to the root chamber 224. The fluid passage 228 is connected to the fluid delivery structure 108 and is controlled in the same manner as is discussed above.

A rooting mat 230 is provided in the interior of the root chamber 224 adjacent to the permeable pad 226. The rooting mat 230 includes a growth substrate 96 such as is discussed above.

A planter plug subassembly 232 provides the closure which separates the root chamber 224 from the volume in which the foliage is contained. The planter plug assembly 232 serves multiple purposes and is adapted for utilization in embodiments other than those described herein.

Figure 10:
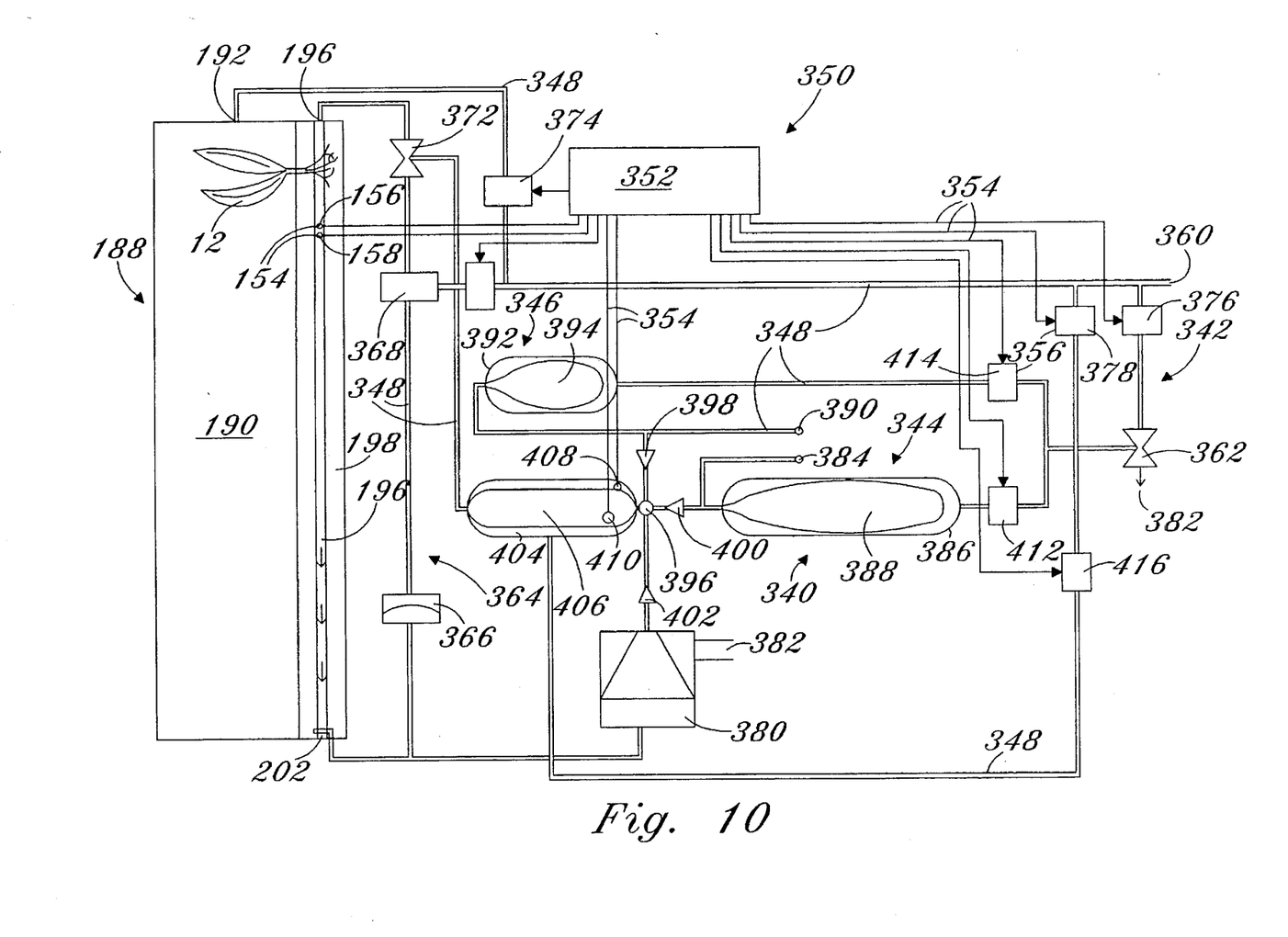
FIG. 10 is a schematic diagram of a deluxe growth requirements assembly particularly adapted for gravity independent operation.

FIG. 10 illustrates, in a rough schematic fashion, a deluxe control and supply structure which is adapted particularly for use with the deluxe growth bag assembly 188 illustrated in FIGS. 7 and 8. The illustration of FIG. 10 particularly emphasizes a deluxe growth requirement assembly 340, which includes as components an air system 342, a water system 344 and a nutrient system 346, with the flow of all of these materials being handled through a network of flow tubes 348.

Also illustrated in FIG. 10 is a deluxe control assembly 350 which is shown primarily in black box fashion and is described by function rather than specific structure. This is because the deluxe control assembly 350 will primarily involve integrated circuitry and internal control mechanisms which are well known in the art and can be reproduced by reference to function. The primary elements of the deluxe control assembly 350 which are illustrated in FIG. 10 include a master control module 352 which receives and transmits electric signals over a network of control conductors 354. A series of solenoid valves 356 provides the interface between the deluxe control assembly 350 and the deluxe growth requirement assembly 340.

The primary components of the air system 342 are a primary air supply 360 (a source of air at above-ambient pressures) and a vacuum source 362, typically a vacuum pump. The air supply 360 provides positive pressure and the vacuum source 362 provides negative pressure which may be selectively delivered to portions of the flow tubes 348 by manipulation of the solenoid valves 356.

One portion of the air system 342 deals with the pressure differential between the fluid inlet port 196 of the deluxe growth bag assembly 188, and the common outlet port 202. This utilizes a bag pressure loop 364 which is adapted to sense and compensate for pressure condition occurring within the deluxe growth bag assembly 188. The bag pressure loop 364 includes a pressure isolator 366 and a gravity compensator 368. The gravity compensator 368 is adapted to sense the relative pressure at point X (see FIG. 10) and to interact with the master control unit 352 to provide a determination whether the pressure is adequate enough to maintain the proper fluid flow rate within the substrate bag 198. If an insufficient pressure differential is sensed by the gravity compensator 368, as may be the case under zero gravity conditions, the master control unit 352 will then compensate by adjusting the solenoid valve 356 designated as SV1 370 which controls the flow of air into a carburetor 372 which provides the interface between the air system 342 and the combined output of the water system 344 and the nutrient system 346 for the total delivery to the fluid inlet port 196. Particularly in below or zero gravity conditions, a very slight positive pressure at the fluid inlet port 196 can insure proper water and nutrient flow through the fluid distribution tube 186 within the substrate bag 198. A second solenoid valves 356 SV2 174 controls the delivery of air to the air inlet port 192 in order to keep the bag enclosure 190 inflated to the desired degree. For this purpose, and others, a positive pressure of air is maintained at the air inlet port 192.

The relative positive or negative air pressure which is delivered to the solenoid valves SV1 370 and SV2 374 is controlled by the condition of two additional solenoid valves 356 SV3 176 and SV4 378, which balance the pressure by combining the relative positive or negative pressure from the air supply 360 and the vacuum source 362 to achieve the desired results.

The air and the fluid components which are introduced into the deluxe growth bag assembly 188 at the air inlet port 192 and the fluid inlet port 196 will combine to exit through the common port 202. From the common port 202, the mixture will be delivered to a water separator 380. This will separate the fluid component from the gaseous component and allow the gaseous component to leave the system through an air exhaust 382. An additional air exhaust 382 is provided at the vacuum source 362.

The water system 344 and the nutrient system 346 are closely related and work together to deliver a mixture water and nutrients to the growth bag assembly 188. The operation of the water system and the nutrient system is controlled by the master control unit 352 utilizing air pressure provided through the air system 342.

In the embodiment illustrated in FIG. 10, the water system 344 includes a water fill port 384, and a main water tank 386, which includes, in the interior thereof, a water bladder 388.

Similarly, the nutrient system 346 includes a nutrient fill port 390, a nutrient tank 392 and a nutrient bladder 394. Since the nutrient which is to be utilized with this embodiment is in fluid form, either in the form of dissolved nutrients or suspended solids within a fluid, it will flow in accordance with fluid principles and need not be treated with solid handling systems.

The fluid flow tubes 348 which are connected to the water bladder 388 and the nutrient bladder 394 converge at a fluid junction 396. A first flow valve 398, a second flow valve 400 and a third flow valve 402 control the fluid input to the fluid junction 396, which is further connected to a mixing tank 404 and more particularly to a mixture bladder 406 which is contained within the mixing tank 404. The mixing tank 404 further includes a volume sensor 408 associated with the mixing bladder 406 for sensing the volume of fluid contained within the mixing bladder 406. A concentration sensor 410, situated within the mixing bladder 406, senses the relative concentration of nutrient in water within the mixing bladder 406.

A flow pattern of fluids within the water system 344 and the nutrient system 346 is controlled by the master control unit 352, utilizing the air system 342. In particularly, a fifth solenoid valve 356 SV5 412, and a seventh solenoid valve 356 SV7 416, a sixth solenoid valve 356 SV6 414, respectively control the flow of materials within the water system 344, the nutrient system 346 and the mixing tank 404. The structure and purpose of the various components in the water and nutrient system is best understood from an analysis of the operation.

The water tank 386 and the nutrient tank 392 are similar in structure, although unlikely to be the same size since the water requirements are substantially greater than the nutrient requirements in a typical growth environment. In each case, the associated water bladder 388 or nutrient bladder 394 is contained within the volume of associated tank and is connected to a section of flow tubes 348 which leads to the associated fill port 384 or 390 and to the fluid conjunction 396. Each of the tanks 386 and 392 includes an exterior volume which is connected by flow tubes 348 to the air system 342 and particularly to the associated solenoid valves SV5 412 or SV6 414.

In order to fill the water bladder 388 such that a desired amount of water is reserve for usage, a water source is connected to the water fill port 384. The fifth solenoid valve 412 will then be opened to the vacuum source 362 such that a negative pressure condition is created around the water bladder 388. This negative pressure will cause the bladder 388 to expand and draw the fluid into the bladder 388 from the water fill port 384. When the filling process is completed, the fifth solenoid valve 412 will be closed to permit a static condition.

A similar filling procedure applies with respect to the nutrient tank 392 and the nutrient bladder 394. In this case, the negative pressure which allows filling from the nutrient fill port 390 is provided by opening the sixth solenoid valve 414.

When it is desired to provide a mixture of water and nutrients to the deluxe growth bag assembly 188, the content of the water bladder 388 and the nutrient bladder 394 are utilized and combined utilizing the mixing tank 404, particularly the mixing bladder 406. The first flow valve 398, the second flow valve 400, and the third flow valve 402 are all one way check valve which prohibit reverse flow of fluids therethrough. The flow valves permit influx of fluid into the fluid junction 396 from three sources. In addition to the fresh water from the water bladder 388 and fresh nutrient solution from the nutrient bladder 394, the third flow valve 402 also permits influx from the water separator 380. To this extent, the system recycles the water and dissolved solids which come from the common outlet 202, and thus maximizes efficiency. To the extent that any fluid is available from the water separator 380, this will be preferentially delivered into the fluid junction 396. Therefore, the third flow valve 402 will ordinarily be opened first when it is desired to add additional fluid to the mixing bladder 406.

The volume of fluid within the mixing bladder 406 is sensed by the volume sensor 408. If the volume sensor 408 sends a signal to the master control 352 to the effect that the content is insufficient in volume, then the seventh solenoid valve SV7 416 will be opened to the vacuum source 362 such that the interior of the mixing tank 404 surrounding the bladder 406 is evacuated and fluid is drawn into the mixing bladder 406 from the fluid junction 396.

The fluid which will be first drawn into the mixing bladder 406 will be in the form of the recycled fluids from the third flow valve 402. If additional volume of fluid is required the second flow valve 400 will be opened to allow water from the water bladder 388 to flow into the mixing bladder 406. The concentration sensor 410, within the mixing bladder 406, will send signals to the master control 352 corresponding to the concentration of nutrients within the mixing bladder 406. If the concentration is insufficient, the first flow valve 398 will be opened and the nutrient solution from the nutrient bladder 394 will be drawn into the mixing bladder 406.

When the proper concentration and volume of nutrient mixture has been accomplished within the mixing bladder 406 it is ready to be delivered to the growth bag assembly 188 when required. The master control 352 determines whether additional fluid is required in the substrate bag 198 by analyzing the output of the saturation sensors 154. If the output of the saturation sensors 156 and 158 is such that additional water and/or nutrients are required, or if the timing sequences indicate that an inflow is desirable, then the carburetor 372 is activated to permit mixing of the nutrient fluid with the air from the gravity compensator 368 for delivery to the fluid inlet port 196. Control of the various solenoid valves 356 insures that the proper mixture and flow pressure are achieved with respect to all of the growth requirements being delivered. It is noted that, although the solenoid valves 356, and particularly the SV5 412, SV6 414 and SV7 416 units have been described as providing negative pressure to surround the associated bladder elements, it is also possible that positive pressure may be applied in order to help expel fluid therefrom and to deliver fluid to other portions of the structure, such as the carburetor 372.

As described, the structure of FIG. 10 is a complex and all encompassing growth requirement delivery structure which is adopted to provide essentially "hands-free" operation with respect to the modular deluxe growth bag assembly 188. It is understood that the gravity independent photosynthetic growing system 10 may operate in a much less complex fashion and with substantially greater operator input.

As described herein, the gravity independent photosynthetic growing system 10 of the present invention is subject to a substantial degree of dimensional and material modification without having an adverse effect on the performance. As stated, the height of the growth sectors 50 is purely a matter of choice and the number of sectors may be revised depending on space requirements and the nature of plants which are intended to be planted therein. The construction materials need to be selected in such a manner that the structure is maintained and that the fiber optic characteristic of the sector plates 52 are maintained. However, these limitations still leave an extremely broad variety of material and dimensional choices.

In the event that a foliage bag 170 is utilized in connection with the root bag 98 or deluxe growth bag assembly 188 is used, it is important that the foliage bag 170 be transparent to the photosynthetic inducing radiation. However, for many purposes it is desirable that the root bag 98 or seed mat 172, itself, be opaque to provide ideal root growing conditions. Of course, constructions alternate to these, such as an enclosed pipe having a variety of stem portals 104 formed therein, will also be useful.

Those skilled in the art will readily recognize that numerous other modifications and alterations of the specific structure, dimensions, materials and components may be made without departing from the spirit and scope of the invention. Accordingly, the above disclosure is not to be considered as limiting and the appended claims are to be interpreted as encompassing the entire scope of the invention.

INDUSTRIAL APPLICABILITY

The gravity independent photosynthetic growing system 10 according to the present invention is adapted to be utilized in a wide variety of circumstances, particularly in adverse conditions in which normal agriculture is not feasible. It is especially well adapted for use in vehicles and isolated circumstances, such as submarines, space stations and underground installations. The structure is adapted to be gravity independent so that it may be utilized in any orientation and may also be utilized in circumstances, such as a space station, wherein gravity is unavailable as a major force in providing material flow. On the other hand, the system is adapted to be fully utilizable under gravitic conditions, if desired.

The system 10 is adapted to require a minimum of operator interface in order to quickly and effectively cause the growth of plants which may be usable for food stuffs and for oxygen replacement. In general, the operator input will be in the form of planting (placement of seed mats, etc.), harvesting and adjusting the various parameters on the control panel 130, in order to correspond to the particular type of growing plant material 12 which is being planted in each of the growth sectors 50. In many cases, these adjustments of parameters will be empirically determined based on the particular type of plant, the gravitic conditions and the nature of the rooting medium 100.

In order to utilize the photosynthetic growing system 10, the user will open the door 76 and utilize the rotational interrupt 144 (which may or may not be coupled to the door latch 78) to stop the rotation with an empty growth sector 50 situated to be aligned with the door 76. The user will then place an elongated root bag 98 (or a deluxe growth bag assembly 188) to extend "vertically" within the sector 50 and will secure it in place by any of a variety of means, particularly by the securing ties 102. As a part of installation of the root bag 98, the user will place the saturation sensors 154 (including the upper sensor 156 and the lower sensor 158) within the rooting medium 100 at longitudinally displaced locations. The seeds or shoots of the growing plant material 12 will already be present in the root bag 98 with the stems 166 being directed toward the stem portal 104.

The root bags 98 (or similar seed mats 178 or deluxe growth bags 188) will be adapted to mate with the input portal 90 formed in the top disk 48, and the output portal 92, formed in the base disk 46, and associated with the particular sector 50. This will allow proper interface between the growing medium and the growth requirements assembly 34.

Once the growing medium 98, or 178, or 188 has been properly installed and the growth parameters have been set with the control panel 130, the system 10 may be operated essentially automatically until the time of harvest. The user may make periodic checks of the progress. These checks need not disturb the internal atmosphere since the window 80 is provided in the door and the interior illumination will usually be activated as a result of the illumination lamps 42. Only at the time of harvest, or in the event of some sort of necessary adjustment, will the door 76 need to be opened.

Once the plants 12 within a particular growth medium have been completely harvested, the entire growth medium may be removed and replaced. This makes for efficient modular operation, since the root bags 98 seed mats 178 and deluxe growth bag 188 may be prepared at a different location and stored for actual use.

In a typical application, such as the Vulcan or Gemini variety of lettuce, the photosynthetic growing system 10 may produce a complete crop in approximately thirty-five days. Since the sectors 50 need not be simultaneously planted, a continuous supply of vegetables may be serially produced by the system with different varieties or different sectors of the same variety becoming ripe at different times.

Further, the self-containment of the system is valuable in maximizing recycling capability and minimizing potential contamination either to or from the surrounding environment. Especially when incorporating the deluxe growth requirements assembly 340, the system will have almost no impact on the surrounding environment except in some heat dissipation and in increased oxygen. The oxygen produced by the foliage is a distinct benefit, as well.

Because the photosynthetic growing system 10 of the present invention is compact, self-contained and efficient, and is adaptable for use in a variety of circumstances wherein normal plant growth techniques are ineffective, it is expected that it will have significant appeal. Accordingly, it is expected that the gravity independent photosynthetic growing system 10, according to the present invention, will have industrial applicability and commercial utility which are both wide spread and long lasting.

I claim:

1. A photosynthetic growing system for use in growing plant matter under controlled conditions, comprising:

a growing chamber subsystem including a plurality of radially separate growth chambers surrounding an excluded central core, each chamber being adapted to enclose growth substrate means and to permit expansive growth of the plant matter therewithin, each said chamber being adapted to retain plant growth substrate in the portion nearest said central core;

a motive subsystem for selectively rotating said growing chamber subsystem;

an illumination subsystem for providing and delivering photosynthetic usable electromagnetic energy to the plant matter, said illumination subsystem including lighting means situated within the central core, light transmissive means intermediate said growth chambers and reflective means situated outside and separated from said growing chamber subsystem, such that phototropic radially outward growth is encouraged in the plant matter;

a material provision subsystem for selectively providing nutrients and delivering growth fluids to the plant matter contained within the growth chambers.

2. The photosynthetic growing system of claim 1 wherein the plant matter selected are those having root systems adapted to be contained substantially within the growth substrate means.

3. The photosynthetic growing system of claim 1 wherein said growing chamber subsystem is in the form of an elongated cylinder, the axis of which corresponds to a primary axis of rotation of said motive subsystem, and includes the excluded central core and a plurality of growth chambers in the form of elongated annular cylindrical segments disposed radially about the central core.

4. The photosynthetic growing system of claim 3 wherein the lighting means includes elongated illumination tubes disposed axially within the excluded central core; and the reflective means includes a stationary reflective cylinder disposed about the majority of the elongated annular cylindrical segments.

5. The photosynthetic growing system of claim 4 wherein the growth substrate means includes an enclosing bag for retaining a root supportive substrate, the enclosing bag being provided with apertures such that stems of plants may extend therethrough into the growth chambers.

6. The photosynthetic growing system of claim 1 and further including an enclosure subsystem for containing said previously identified subsystems, the enclosure subsystem including door means to provide access to the growth chambers.

7. The photosynthetic growing system of claim 1 wherein dark zones are further provided within the growing system for growing non-light requiring plants.

8. The photosynthetic growing system of claim 1 and further including climate control means for maintaining desirable growing conditions for the plants.

9. The photosynthetic growing system of claim 1 and further including operator adjustable control means for setting operational parameters for said motive subsystem, said illumination subsystem and said material provision subsystem.

10. A gravity independent photosynthetic growth system, for growth of plant material under artificial conditions, comprising:

at least one elongated lamp member, disposed parallel to and in the vicinity of a defined axis;

a plurality of growth sectors disposed radially about said defined axis, each said growth sector including light transmissive side panels for transmitting light from said at least one elongated lamp member therethough, and plant anchoring means for supporting growing plant material therewithin, said plant anchoring means being situated at a portion of an associated growth sector nearest said defined axis;

surrounding reflective means disposed radially about and exterior to said plurality of growth sectors for reflecting light generated by said at least one elongated lamp member and transmitted through said light transmissive side panels inward into said growth sectors;

a growth requirements assembly for maintaining desirable plant growing conditions within said growth sectors.

11. The gravity independent photosynthetic growth system of claim 10 wherein said growth sectors are disposed within a drum assembly having a central core, the drum assembly forming a cylinder about said defined axis; and motive means are provided for rotating the drum assembly about said defined axis.

12. The gravity independent photosynthetic growth system of claim 10 wherein each said growth sector extends radially outward from an interior central tube member and includes two of said light transmissive side panels, each extending along a radial plane from said defined axis.

13. The gravity independent photosynthetic growth system of claim 10 wherein each said growth sector is open toward said surrounding reflective means to provide access to the growing plant material and to maximize light delivery to the growing plant material from said surrounding reflective means.

14. The gravity independent photosynthetic growth system of claim 10 and further including an enclosing assembly for substantially isolating said growth sectors from conditions exterior to the enclosing assembly, the enclosing assembly including user operable access means for accessing the interior thereof.

* * * * *

UNITED STATES PATENT AND TRADEMARK OFFICE
CERTIFICATE OF CORRECTION

PATENT NO. : 5,617,673
DATED : April 8, 1997
INVENTOR(S) : TAKASHIMA, Y.

It is certified that error appears in the above-identified patent and that said Letters Patent is hereby corrected as shown below:

In the Abstract, line 16; change "a deluxe" to --A deluxe--;

Col. 1, line 53; after "issued" insert --to--;
Col. 1, line 60; after "issued" insert --to--;
Col. 1, line 65; change "Once" to --One--;
Col. 1, line 67; after "issued" insert --to--;
Col. 2, lines 13-14; change "light-s(electromagnetic" to --light (electromagnetic--;
Col. 5, line 64; change "14" to --44--;
Col. 6, line 37; change "insulted" to --insulated--;
Col. 7, line 32; change "apertures" to --ports--;
Col. 7, line 33; change "aperture" to --port--;
Col. 7, line 34; change "apertures" to --ports--;
Col. 7, line 35; change "apertures" to --ports--;
Col. 7, line 36; change both occurrences of "apertures" to --ports--;
Col. 7, line 47; change "aperture" to --port--;
Col. 7, line 53; change both occurences of "aperture" to --port--;
Col. 8, line 34; change "18" to --118--;
Col. 8, line 34; change "20" to --120--;
Col. 8, line 42; change "24" to --124--;
Col. 8, line 57; change "120" to --20--;
Col. 8, line 59; change "120" to --20--;

UNITED STATES PATENT AND TRADEMARK OFFICE
CERTIFICATE OF CORRECTION

PATENT NO. : 5,617,673
DATED : April 8, 1997
INVENTOR(S) : TAKASHIMA, Y.

It is certified that error appears in the above-identified patent and that said Letters Patent is hereby corrected as shown below:

Col. 10, lines 9-10; delete "as illustrated in FIG. 3";
Col. 10, line 66; change "12" to --112--;
Col. 11, line 8; change "strays" to --trays--;
Col. 11, line 29; change "creative" to --created--;
Col. 11, line 30; change "see" to --seed--;
Col. 11, line 39; change "tube 178" to --tube 186--;
Col. 11, line 40; change "maybe" to --may be--;
Col. 11, line 41; change "most sufficient" to --an efficient--;
Col. 11, line 49; change "polymer get" to --polymer gel--;
Col. 12, line 47; change "curred" to --curved--;
Col. 12, line 53; change "oppose" to --opposing--;
Col. 13, line 60; delete "(see FIG. 10)";
Col. 14, line 9; change "174" to --374--; and
Col. 16, line 49; change "172" to --178--.

Signed and Sealed this

Twenty-sixth Day of January, 1999

Attest:

Attesting Officer

*Acting Commissioner of Patents and Trademarks*